United States Patent Office 2,854,791
Patented Oct. 7, 1958

2,854,791

TREATMENT OF IRON CHLOROSIS

Joe Antognini, Mountain View, Calif., assignor to Stauffer Chemical Company, a corporation of Delaware No Drawing. Application June 11, 1956
Serial No. 590,390

3 Claims. (Cl. 47—58)

This invention relates to the treatment of iron chlorosis in plants and particularly relates to the treatment of iron chlorosis utilizing a series of novel treating agents. This application is a continuation-in-part of my application Serial No. 559,531, filed January 17, 1956.

Iron deficiency or iron chlorosis as it is more commonly called affects many species of plants. Iron chlorosis is readily diagnosed by visual examination of the leaves. In mild cases, the leaf veins are darker green than the areas between the veins, and as the deficiency increases, the areas between the veins become perceptibly yellow. In severe cases, the areas between the veins as well as the veins fade to an ivory color and the plants become partially defoliated and die-back results.

Iron chlorosis may be caused by one or a combination of the following:

(1) Actual deficiency of iron in the soil.
(2) Lack of available iron due to:

(a) High manganese content of the soil.
(b) High copper content of the soil.
(c) High pH (above approximately 7.0) of the soil.
(d) High lime ($CaCO_3$) content of the soil.

It has heretofore been thought that iron chlorosis could only be controlled by the application to the plant or the soil in which the plant is grown of a compound having available iron. In many instances, this is true and it is necessary to apply some form of iron, either applied directly to the plant or to the soil. However, I have found that in many instances the iron chlorosis is not brought about by any lack of iron in the plant, but is brought about by the iron in the plant being in a form which the plant cannot utilize. It is frequently found that if a chemical analysis is made of plant parts, that chlorotic parts frequently contain as much or even more actual iron that similar parts from non-chlorotic plants. Thus, under certain conditions, it should be possible to bring iron chlorosis under control without the actual application of iron to the plant, but only by the application of a compound which in some manner makes the iron available for utilization by the plant. In addition, it has been found that in many instances, that if even an actual application of iron is necessary, it is possible to secure good results by applying a compound to the plant which makes iron available since there are frequently extraneous sources of iron which can be brought into utilization, such as dust on the leaves of a plant.

Thus, the present invention contemplates the use of certain compounds for application to the plants which compound may either contain iron or which may make iron available to the plant, which is already present either within the plant proper or on the leaves or other surfaces of the plant.

In accordance with the present invention, it has been found that aromatic sulfonium or phosphonium compounds have the property of controlling iron chlorosis and that in many instances these compounds by themselves may be applied to plants to cure the chlorosis. It has been further found that such sulfonium or phosphonium compounds may be formed into complexes with iron and that the complexes may be used for the treatment of the plants, either by application to the plant itself, or by application to the soil.

The following are typical examples of compounds falling within the scope of the present invention and which are effective for the control of iron chlorosis. Each of the compounds listed below has been assigned a code number, and reference throughout the balance of the specification will be to such code number.

T862—Di(p-chlorophenyl) paramethyl phenyl sulfonium chloride
T868—Triphenyl sulfonium 2,4-dichlorophenoxyacetate
T870—Triphenyl sulfonium thiocyanate
T1766—Tetraphenylphosphonium iodide
T1790—Paramonochlorophenyl, diphenyl sulfonium chloride
T1794—Tri(2,4,5-trichlorophenyl) sulfonium chloride
T1843—Dibenzyl methyl sulfonium methyl sulfate
T1844—Di-n-butyl methyl sulfonium methosulfate
T1845—Di-n-propyl methyl sulfonium methosulfate
T867—Triphenyl sulfonium chloride.

Of the above, it is preferred to use T867.

Although it is generally preferred to complex the above onium compounds with iron, as has been pointed out above, the onium compounds by themselves frequently may be used as effective treatments for iron chlorosis.

One particularly effective form of iron was made by complexing triphenyl sulfonium chloride with ferric chloride hydrate. The resulting complexes contained from 8.5% to 9.8% iron as metallic iron.

Other effective treating agents may be prepared utilizing other iron compounds and other triaromatic sulfonium compounds. For instance, successful agents have been prepared utilizing ferrous ammonium sulfate, ferric tartrate, ferric nitrate, ferrous sulfate, ferric phosphate, ferric sulfate, ferric ammonium sulfate, as well as ferric chloride. Of these, it is preferred to use ferric chloride.

The exact proportions of the iron compound and the onium compound are not critical. However, one must use at least one mole of the onium compound for each mole of the iron compound to chelate the latter. Of course, a greater amount of the onium compound can be used, but an excess of the onium compound serves no useful purpose and merely dilutes the treating agent. Generally speaking, it is preferred to use the compounds on a mole for mole basis.

In applying the compounds of the present invention to foliage, it has been found that the best results are obtained by utilizing a relatively dilute aqueous solution. Solutions ranging in concentration from about one pound per 100 gallons to about six pounds per 100 gallons are suitable. When the material is applied directly to the soil, a small amount of the compound is worked into the soil surface, and a quantity of water is then flooded over the soil.

The following specific examples illustrate various methods of carrying out the present invention.

*Example 1.—Application to chlorotic pear trees*

This test was carried out at a ranch near Santa Clara, California. Five young pear trees, about 9 ft. high, which were severely chlorotic, were used. The material for this test was a mixture of triphenyl sulfonium chloride and ferric chloride containing 8.5% iron as metallic, and solutions were prepared containing 2.8 pounds of the complex per 100 gallons, and 5.6 pounds of the complex per 100 gallons. Two of the trees were sprayed with the former solution, one tree was sprayed with the latter solution, one tree was soil treated by working one pound of the complex into the top ½" of soil, followed by an application of fifteen gallons of water, and one tree was left as a control. The condition of the control tree did not materially change during the course of the test. The spraying was done with a fan type nozzle at 25 pounds pressure and both surfaces of the leaves were sprayed as thoroughly as possible. The following results were obtained:

TABLE I.—EFFECT ON GREENING

| Days after application | 1 lb. soil | 2.8/100 | 5.6/100 | 2.8/100 |
|---|---|---|---|---|
| 5 | No change | No change | No change | No change. |
| 8 | do | Blotch greening on new shoots on tips almost completely green. | | New leaves. |
| 14 | Blotch greening of new leaves. | Good greening | Fair greening | Good greening. |
| 18 | Good greening of new leaves. | Good greening, especially new leaves. | Fair to good greening. | Good greening, especially new leaves. |

Example 2.—Application to chlorotic gardenias

Severely chlorotic gardenia plants growing in one gallon cans were obtained from a nursery for use in the test. On two of the plants the foliage was thoroughly sprayed with a solution containing 1 lb. of the complex of Example 1 per 100 gallons. On two other plants, 1.6 oz. of the complex of Example 1 was applied to the soil and the plant was freely watered. In both cases, there was a substantial improvement after 13 days, and after 27 days, the plants showed good greening. In the case of the plants having the solution applied to the foliage, the results were noticeable after only seven days, while in the case of the plants having the complex applied to the soil, the results did not become apparent for thirteen days.

Example 3

In this example, a comparison was made on pear tree branches in applying a complex similar to that of Example 1 at concentrations of 1, 2 and 4 pounds per 100 gallons. A modified formula was used so that the iron content was 9.8% expressed as metallic iron. Each treatment was replicated three times and the following results were obtained:

| Treatment | Rep. | Days After Application | | | | | |
|---|---|---|---|---|---|---|---|
| | | 0 | 5 | 8 | 11 | 14 | 21 |
| 1 lb | 1 | Mod | V. S. | V. S. | V. S. | V. S. | V. S. |
| | 2 | Sev | Mod.-Sev | Mod.-Sev | Mod.-Sev | Mod | Mod. |
| | 3 | Mod | Mod | Sl.-Mod | Slight | | Sl. |
| 2 lbs | 1 | Sev | Mod.-Sev | Mod | Mod | Mod | Sev. |
| | 2 | Mod | Mod | Sl.-Mod | Sl.-Mod | Sl.-Mod | Sl.-Mod. |
| | 3 | Mod | Sl | V. S. | V. S. | V. S. | V. S. |
| lbs | 1 | Mod | S. Mod | Sl.-Mod | Sl.-Mod | Sl.-Mod | Sl.-Mod. |
| | 2 | Mod | Mod | Mod | S.-Mod | Sl.-Mod | Sl.-Mod. |

In the above table, V. S. indicates very slight, Sl. indicates slight chlorosis, Mod. indicates moderate chlorosis, and Sev. indicates severe chlorosis.

Example 4.—Effect on pear fruit injury

Some treatments which have heretofore been used have resulted in injury to fruit. For instance, when pears were sprayed with some conventional agents for the treatment of chlorosis, a large percentage of them developed burned spots and/or black pits. In this test, pear trees having well developed fruit were sprayed with two pounds per 100 gallons ferric chloride-triphenyl sulfonium chloride complex. The trees originally showed moderate to severe chlorosis and after 21 days, the condition of all trees was good. On the other hand, there was no detectable injury to the fruit.

Example 5.—Application to chlorotic roses

A complex of ferric chloride-triphenyl sulfonium chloride containing 9.8% iron as metallic was prepared. Roses being grown in a greenhouse near Palo Alto, California, were selected for test. Treatment No. 1 consisted of a spray application of ferric chloride-triphenyl sulfonium chloride complex at the rate of 2 pounds per 100 gallons; treatment No. 2 consisted of a spray containing 4 pounds of the complex per 100 gallons, while treatment No. 3 consisted of applying two pounds of the complex per 1,000 square feet of soil, followed by a thorough wetting of the soil. The following data were obtained:

RATINGS ON DEGREE OF IRON CHLOROSIS

| Treatment | Replicate | At time of application | 7 days after application | 14 days after application |
|---|---|---|---|---|
| 2 lbs./100 gallons | 1 | Mod | Sl.-Mod | Slight. |
| | 2 | Sev | Mod | Mod. |
| | 3 | Sev | Mod | Mod. |
| 4 lbs./100 gallons | 1 | Mod.-Sev | Mod | Mod. |
| | 2 | Sl. to Mod | Slight | Slight. |
| | 3 | Mod.-Sev | Mod | Sl.-Mod. |
| 2 lbs./1,000 sq. ft | 1 | Mod | Mod | Mod. |
| | 2 | Mod | Sl.-Mod | Slight. |
| | 3 | Sev | Mod.-Sev | Mod.-Sev. |
| | 4 | Sev | Mod | Mod. |
| | 5 | Sev | Mod | Mod. |
| | 6 | Slight | Slight | Slight. |

Example 6

Treating agents were made by combining triphenyl sulfonium chloride with a number of different iron salts. Equivalent amounts of the iron salt and sulfonium compound were used, and the solutions were diluted with water so as to contain 0.022% iron as metallic. The solutions were applied to branches of old lemon trees and there were four replications per treatment. In each case there was an effective greening of the treated limbs. The following data were obtained.

| Fe Salt | Degree of Greening | | | | Numerical Av. |
|---|---|---|---|---|---|
| | I | II | III | IV | |
| Ferrous ammonium sulfate | Poor | Poor | Poor | Poor | 2.0 |
| Ferric tartrate | Poor | Poor | Poor | Good | 2.7 |
| Ferric nitrate | Fair | Fair | Fair | Fair | 4.0 |
| Ferrous sulfate | Good | Good | Fair | Fair | 4.5 |
| Ferric phosphate | Poor | Fair | Poor | Poor | 2.5 |
| Ferric sulfate | Good | Fair | Fair | Good | 4.5 |
| Ferric ammonium sulfate | Good | Good | Fair | Fair | 4.5 |
| Ferric chloride | Good | Fair | Good | Fair | 4.5 |
| Control | none | none | none | none | 0 |

Example 7

Tests were conducted as in Example 6 except that ferric chloride was used in each instance with various onium compounds. The following data were obtained:

| Compound | I | II | III | IV | Numerical Av. |
|---|---|---|---|---|---|
| T-839 | Poor | Fair | Poor | Poor | 2.5 |
| T-862 | Fair | Poor | Poor | Poor | 2.5 |
| T-868 | Good | Fair | Poor | Poor | 3.2 |
| T-870 | Fair | Fair | Good | Poor | 3.7 |
| T-1766 | Fair | Poor | Poor | Poor | 2.5 |
| T-1790 | Poor | Poor | Fair | Poor | 2.5 |
| T-1795 | Poor | Poor | Poor | Poor | 2.0 |
| T-1843 | Poor | Poor | Poor | Poor | 2.0 |
| T-1844 | Good | Fair | Good | Poor | 4.0 |
| T-1845 | Good | Fair | Poor | Fair | 2.7 |
| T-867 | Good | Fair | Good | Fair | 4.5 |
| Control | none | none | none | none | 0 |

Example 8.—Effect of T-867 on iron chlorotic greenhouse roses

The T-867 iron complex and T-867 alone were applied to iron chlorotic rose stems in attempt to obtain an indication as to whether T-867 alone would have any effect. The test was not ideal because entire plants were not chlorotic and only the stems were chlorotic.

The T-867 iron complex was applied at 0.024 and 0.048% Fe and the T-867 was applied at rates equivalent to that which would be applied with the complex containing 0.012, 0.024, and 0.048% Fe. Application was as a thorough cover spray.

Ratings were made on the following scale:
(1) Normal
(2) Very slight chlorosis
(3) Slight chlorosis
(4) Slight—moderate chlorosis
(5) Moderate chlorosis
(6) Moderate—severe chlorosis
(7) Severe chlorosis Chlorosis Ratings (Av. of replications):

| Treatment | At time of Application | 42 days after application | |
|---|---|---|---|
| | | Old leaves | New growth |
| T-867 Fe complex-0.024% Fe | 5.25 | 4.50 | 3.25 |
| T-867 Fe complex-0.048% Fe | 4.50 | 3.50 | 2.00 |
| T-867 alone-0.012% Fe Equiv | 4.75 | 3.50 | 3.00 |
| T-867 alone-0.024% Fe Equiv | 5.00 | 4.50 | 4.75 |
| T-867 alone-0.048% Fe Equiv | 5.00 | 4.00 | 3.00 |
| Check | 5.00 | 5.75 | 5.75 |

The T-867 iron complex and T-867 alone both resulted in a decrease of the iron chlorosis on both the old and new growth.

Example 9.—Effect of T-867 on iron chlorotic pears

Severely iron chlorotic pears (Var.-Comice) on a ranch near Santa Clara, California, were used for the test. Four trees were used for each treatment and application was with a power sprayer at 300 lbs. pressure. The T-867 iron complex was applied at rates of 0.024% and 0.048% Fe and the T-867 was applied at rates equivalent to that which would be applied with the complex containing 0.024 and 0.048% Fe. Application was as a thorough cover spray.

The rating scale used was based on the percent of the leaf area which was green. A plant showing severe chlorosis would be rated 0 (i. e., 0% of the leaf area green) and a normal green plant would be rated 100 (i. e., 100% of the leaf area dark green).

Chlorosis ratings (AV. of 4 replications):

| Treatment | At time of application | 9 days after application | 34 days after application | Percentage increase |
|---|---|---|---|---|
| T-867 Fe (0.024% Fe) | 15 | 50 | 85 | 70 |
| T-867 Fe (0.048% Fe) | 15 | 60 | 95 | 80 |
| T-867 (0.024% Fe equiv.) | 15 | 15 | 95 | 80 |
| T-867 (0.048% Fe equiv.) | 15 | 15 | 75 | 60 |
| Check | 10 | 10 | --- | 0 |

Both the T-867 Fe and the T-867 alone resulted in a significant decrease of the iron chlorosis.

I claim:
1. The method of treating iron chlorosis in a chlorotic plant growing in the presence of unavailable iron comprising: applying to the chlorotic plant an effective amount of a member selected from the class consisting of phenylphosphonium and organic sulfonium compounds.
2. A process of claim 1 wherein said member is triphenyl sulfonium chloride.
3. The process of claim 1 wherein the onium compound is applied to the leaves of the plant.

References Cited in the file of this patent

UNITED STATES PATENTS

| | | |
|---|---|---|
| 2,366,176 | Britton et al. | Jan. 2, 1945 |
| 2,402,016 | Britton et al. | June 11, 1946 |
| 2,800,747 | Pitt | July 30, 1957 |

OTHER REFERENCES

Agricultural Chemicals.—"Iron Chelates Control Iron Chlorosis," by Antognini, November 1954, pages 47–49.

Science.—"Chelates as Sources of Iron For Plants," by Stewart et al., vol. 116, November 21, 1952, pages 564–566.